US006938945B2

(12) United States Patent
Wald et al.

(10) Patent No.: US 6,938,945 B2
(45) Date of Patent: Sep. 6, 2005

(54) SKIN FOR A MOTOR VEHICLE

(75) Inventors: Erich Wald, Pfaffenhofen (AT); Peter Telgenbrok, Zolling (DE); Ralf Waldhoer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/296,494

(22) PCT Filed: May 19, 2001

(86) PCT No.: PCT/EP01/05760

§ 371 (c)(1), (2), (4) Date: Jul. 17, 2003

(87) PCT Pub. No.: WO01/92088

PCT Pub. Date: Dec. 6, 2001

(65) Prior Publication Data

US 2004/0046420 A1 Mar. 11, 2004

(30) Foreign Application Priority Data

May 26, 2000 (DE) ........................................ 100 26 264

(51) Int. Cl.[7] ................................................ B60R 27/00

(52) U.S. Cl. .............................. 296/187.01; 296/180.1; 296/193.11

(58) Field of Search ......................... 296/187.01, 180.1, 296/193.11, 187

(56) References Cited

U.S. PATENT DOCUMENTS

| | | | | | |
|---|---|---|---|---|---|
| 3,730,575 | A | * | 5/1973 | Arlauskas et al. | 296/76 |
| 3,747,271 | A | * | 7/1973 | Adamski | 296/76 |
| 4,770,457 | A | | 9/1988 | Tomforde | |
| 4,810,022 | A | * | 3/1989 | Takagi et al. | 296/180.5 |
| 5,934,743 | A | | 8/1999 | Nohr et al. | |
| 6,364,402 | B1 | * | 4/2002 | Sasaki | 296/187.09 |
| 6,522,953 | B1 | * | 2/2003 | Schneider | 700/275 |
| 6,561,301 | B1 | * | 5/2003 | Hattori et al. | 180/274 |
| 6,762,210 | B1 | * | 7/2004 | Oguro et al. | 521/27 |
| 2002/0141085 | A1 | * | 10/2002 | Whitehead et al. | 359/841 |

FOREIGN PATENT DOCUMENTS

| | | | |
|---|---|---|---|
| DE | 3811334 | A1 | 10/1989 |
| DE | 19852944 | C1 | 2/2000 |
| DE | 29917581 | U1 | 2/2000 |
| DE | 19912140 | A1 | 9/2000 |
| DE | 10026264 | A1 | 11/2001 |
| WO | WO 97/26039 | | 7/1997 |

* cited by examiner

*Primary Examiner*—Lori L. Coletta
(74) *Attorney, Agent, or Firm*—Crowell & Moring LLP

(57) ABSTRACT

A motor vehicle shell is at least partially movable. For movement of the sheel, at least one actuator is provided. The actuator contains a material that is polymeric and/or ion-exchanging and/or exhibits varying confirmations, and is movable by of way physical or chemical effects.

21 Claims, 8 Drawing Sheets

SKIN FOR A MOTOR VEHICLE

BACKGROUND AND SUMMARY OF THE INVENTION

The invention concerns a shell for motor vehicles.

For various reasons, it is desirable to design the shell of a motor vehicle in such a way that it will be at least partially movable. For example, spoilers are known from prior art, which are extended when the motor vehicle reaches a predefined speed, in order to improve road adherence. Further, the adjustment of the size of ventilation openings arranged in the shell, as a function of motor temperature and motor vehicle speed, is known from prior art.

In the examples of prior art described above, the movement of the shell is accomplished by means of pneumatic, hydraulic, or mechanical modules. However, modules of this type are expensive and subject to mechanical wear and tear. In addition, these modules are characterized by a high weight and require considerable space. Moreover, the possible modifications of the shell shape are extremely limited and cannot be miniaturized as desired.

One object of this invention is the object of creating a movable motor vehicle shell, which has an expanded degree of functionality and can be manufactured in a cost-effective manner.

This object is attained by the invention. The dependent claims relate to preferred embodiments and developments of the invention.

It is proposed that at least one actuator for the movement of the motor vehicle shell be provided, wherein said actuator includes a material that can be moved by means of physical or chemical effects, and which is polymeric and/or functions as an ion exchanger and/or exhibits varying confirmations.

The movement of the shell, which preferably encompasses a two- or four-wheeled motor vehicle, may consist of either a displacement or a change of shape.

Preferably, the actuator contains either a polymeric ion exchange material or a material that exhibits varying confirmations. The material that exhibits varying confirmations—for example, a liquid crystal elastomer—has two or more different states, which may be distinguished from one another with regard to the orientation or arrangement of the atoms or molecules. By means of chemical or physical effects, a change is made between varying confirmations, causing the material that exhibits varying confirmations to move.

According to the invention materials that are polymeric and/or ion exchanging, and/or exhibit varying confirmations replace the pneumatic, hydraulic, or mechanical modules known from prior art. Materials of this type can be manufactured in a cost-effective manner, can be miniaturized as desired, and enable the generation of forces strong enough for a plurality of extremely different applications. These materials may be used to accomplish reversible movements of the shell, which were not possible to date due to the limitations of pneumatic, hydraulic, and mechanical modules. This, in turn, allows new degrees of freedom with regard to the functioning of the shell. The materials specified in the invention especially enable the adjustment of the movement of the shell as a function of operating parameters of the motor vehicle (for example, speed or motor temperature), or of environmental conditions (for example, state of the highway, air temperature, or weather conditions).

The actuator may be designed as an insert in the shell or an attachment to the shell. The shell may also be equipped with a rigid or elastic area that is coupled to the actuator in such a way that this area is displaced or deformed via the movement of the actuator. In this case, the actuator is preferably located under the shell.

The actuator itself may also constitute part of the shell.

Many materials specified in the invention have the advantage that they react independently, by means of a structural modification, to changes in environmental conditions (outside temperature falls below a predetermined value (for example, 0° C.), it begins to rain, etc.). Thus, materials specified in the invention are known which, in a damp state, change their shape by swelling. This effect can be used to seal splices or to close openings in the shell, for example. It is also conceivable for an actuator to be coupled with a sensor. The sensor can record current parameters with regard to the operation of the motor vehicle or environmental conditions, which are subsequently transformed, for example, into electrical signals for the control of the polymeric and/or ion-exchanging material.

The actuators can be used for the movement of an extremely wide range of areas in the shell of a motor vehicle. For example, an outside mirror, a hood, a spoiler, a bumper, an opening in the shell, or small structures arranged on the shell surface can be made at least partially movable. It is also possible, by means of the actuators, to activate covers—for example, for headlights—or door handles. In addition, movable areas of the shell can be used as design elements or for communication with the environment.

The movement of the actuator can be continuous or discrete. A continuous movement of the actuator may be desired, for example, when a certain value is to be regulated. Thus, it is conceivable, by means of the movement of the shell, to passively regulate the output of the rear axle, for example, in the area of a spoiler. A discrete movement of the actuator can be combined with an active, controlled deformation of the shell. Accordingly, it would be possible, by means of actuators, to control headlight covers between a first, closed position and a second, open position by activating the light switch.

The material of the actuator, which is movable as a result of physical or chemical effects, can take the shape of a strip, a hollow cylinder, a part of an ellipsoidal surface, and so forth. It is also possible, for example, to arrange a number of actuators with strip-shaped polymeric and/or ion-exchanging materials in such a way that the totality of these materials has a hollow cylindrical, hemispherical, etc. shape. The actuator may also contain several layers of these materials, which are arranged one over the other or one concentrically within the other, for example. The provision of several layers increases the stability of the actuator. Moreover, it enables the realization of significantly higher forces in the movement. The movement of the movable material, according to the task at hand, can be induced, for example, by changing the pH value, the humidity, or the temperature of these materials, or via electrical processes.

An elastic envelope, made of latex, for example, advantageously encloses the movable material of the actuator. The envelope protects the material from the effects of the environment. Because some of the materials that may be used according to the invention must be operated in a damp environment, the envelope can simultaneously prevent these materials from drying out.

Additional particulars and preferred embodiments of the invention may be derived from the examples described below, as well as from the figures.

DETAILED DESCRIPTION OF THE INVENTION

Figure 1A:
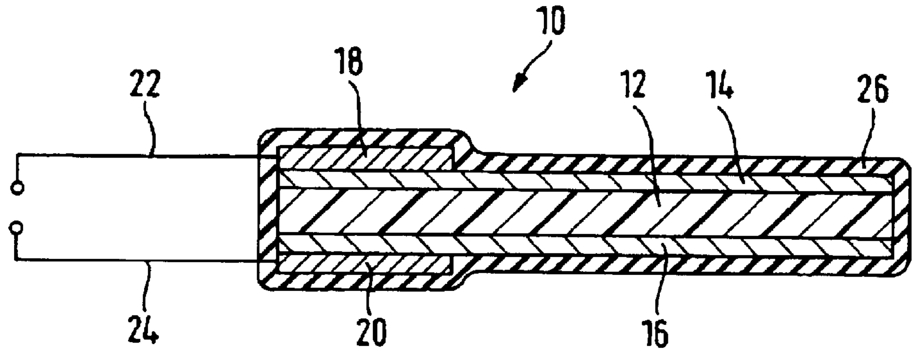
FIGS. 1A and 1B show an actuator at rest and in an activated state, both in cross-section.

The following paragraphs describe several materials that are movable as a result of chemical physical activation. All of these materials may be used in the manufacture of an actuator for moving a motor vehicle shell.

One example of materials having varying confirmations is liquid crystal elastomers. Certain nematic liquid crystal elastomers, in whose network an electrical conducting phase is embedded, can be contracted, expanded, or bent by electrical effects within fractions of a second.

Liquid crystal elastomers of this type may be contained, for example, in a toluene solution, by hydrosilylation of poly(methyl hydrosiloxane) (PMHS), 4-(3-butenoxy)-benzoic acid-(4-methoxy)-phenyl ester as a side chain mesogen, and oligo-TPB-10PV (x=13) as an MCLC network polymer. The elastomer is mechanically loaded, in order to introduce a uniaxial network anisotropy prior to the conclusion of the network reaction. An electrical conducting phase, such as silver particles or graphite fibers, is then introduced into the network—for example, by dispersion.

Composite materials manufactured in this way can accomplish contractile movement, by means of Joule heating, on the basis of a nematic-isotropic phase transformation. Via a nematic-isotropic cooling process, a completely reversible expansion to the original length takes place.

One example of a polymer that may be activated by means of chemical effects is polyacrylonitrile (PAN), which is known by the trade name“Orlon”. Orlon is a ductile substance, whose composition may resemble a gel or plastic, which must be subjected to pre-treatment prior to its use in an actuator. For this purpose, Orlon is initially heated for five hours at 220° C. and is subsequently boiled in a solution of sodium hydroxide.

The resulting pre-treated Orlon fibers of this type contract very quickly, to between one-half and one-tenth of their original length, when the pH value is reduced (via rinsing with an acid medium). When the pH value is subsequently raised (via rinsing with a base medium), the fibers regain their original length. It has been shown that Orlon fibers withstand a tensile loading of up to 4 kg/cm$^2$.

In order to use actuators based upon Orlon for the movement of a motor vehicle shell, the polymeric material must be enclosed in a watertight envelope following pre-treatment. Thus, for example, bundles of Orlon fibers may be arranged within latex tubes. To generate movement of this arrangement, the Orlon fibers arranged within the latex tubes are rinsed with media having different pH values.

It is also possible to use actuators with electrically activated materials, which function as ion exchangers and are based upon, for example, resins, gels, powders, fibers, etc., for the movement of the shell. Suitable primary materials and possible manufacturing processes for actuators of this type have been described, for example, in WO 97/26039 (PCT/US96/17870). The disclosed content of the aforementioned patent with regard to the primary materials for the manufacture of actuators and possible manufacturing processes for actuators is expressly incorporated into this document.

Preferably, ion exchangers based upon polymeric membranes are used. For example, the membrane sold by DuPont under the trade name Nafion™ 117 is suitable.

Figure 1B:
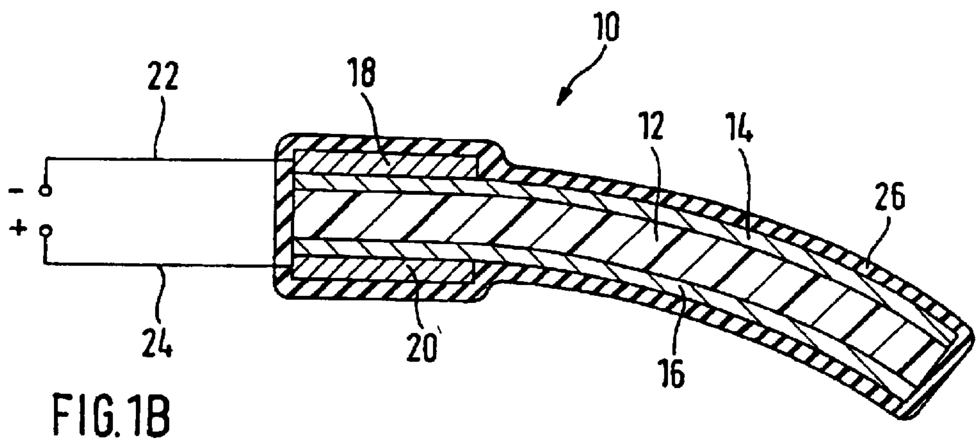

In order to use ion exchangers as actuators, these must generally undergo additional processing. FIGS. 1A and 1B illustrate one embodiment of a completely processed actuator. FIG. 1A shows an actuator 10 based upon a composite material made of a perfluorized, polymeric ion exchange membrane 12, with platinum electrodes 14, 16 chemically deposited on both surfaces of the membrane 12. On each of the two platinum electrodes 14, 16, a contact electrode 18, 20 is arranged. The two content electrodes 18, 20 are electrically contacted by means of wires 22, 24.

For the protection of the composite material consisting of the ion exchange membrane 12 and platinum electrodes 14, 16, said composite material is enclosed within an elastic envelope, for example, made of latex. The envelope 26 also prevents the escape of a liquid ion transport medium, which is essential for the function of the actuator 10. The wires 22, 24 extend through this envelope 26.

When no electrical voltage is applied to the wires 22, 24, the initial state, shown in FIG. 1A, results. In the initial state, the actuator 10 has a basically planar shape. If a voltage typically amounting to 1V to 3V is now applied to the wires 22, 24, the composite material consisting of the ion exchange membrane 12 and platinum electrodes 14, 16 bends in the direction of the anode. This situation is shown in FIG. 1B. The maximum deflection of the composite material can amount to a few centimeters.

Figure 2A:
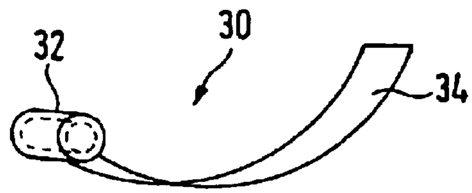
FIGS. 2A to 2C show three further exemplary embodiments of actuators.
Figure 2B:
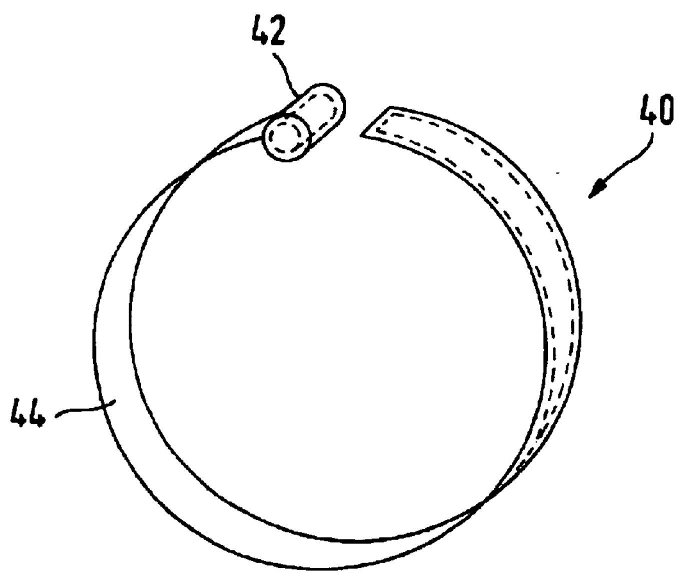
Figure 2C:
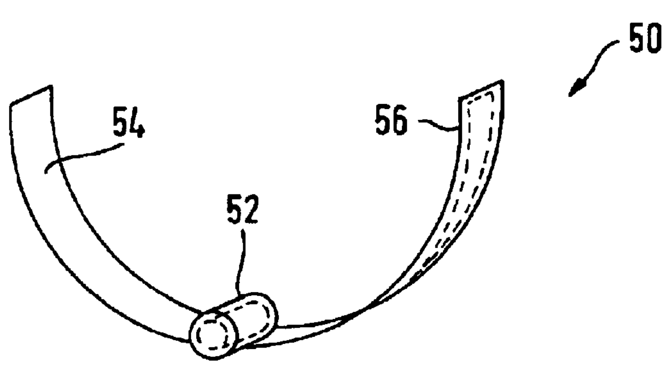

FIGS. 2A to 2C schematically represent several constructions of actuators based upon chemically or electrically activated materials that are polymeric and/or ion-exchanging and/or exhibit varying confirmations. The actuators shown are capable of performing bending movements. In order to convert contractile movements into bending movements, the contractile materials must necessarily be fastened onto a bendable substrate which itself is not contractile.

The actuators 30 shown in FIG. 2A consist of a mounting unit 32 and a movable section 34. The mounting unit 32 is fastened in the area of the motor vehicle shell and is not movable. The mounting unit 32 has supply lines (not shown), for example, in the form of electrical connections or flexible tube connections for the introduction and/or withdrawal of a fluid medium with a defined pH value. The movable section 34 of the actuator 30 is strip-shaped and includes a flexible envelope, within which the material, which is polymeric and/or acts as an ion exchanger and/or shows varying confirmations, is arranged. The actuator 30 according to FIG. 2A is shown in the activated state. In the non-activated state, the actuator 30 has a flat shape.

FIG. 2B shows a second construction of an actuator 40, with a mounting unit 42 and a movable section 44. The actuator 40 basically corresponds to the actuator 30 shown in FIG. 2A. However, the movable section 44 is significantly longer than that of the actuator 30 shown in FIG. 2A. In addition, in FIG. 2B the actuator 40 is shown in the non-activated state. This means that the movable section 44, in the initial state, is already bent, and that the bending of this section 44 can be increased by means of physical or chemical activation.

FIG. 2C shows a third construction of an actuator 50. The structure of this actuator 50 is similar to that of the actuator 30 shown in FIG. 2A. However, the actuator 50 is equipped with a second movable section 56, in addition to a first movable section 54. Both of the movable sections 54, 56 extend in the form of wings from a mounting unit 52 and are already bent in the non-activated state. The bending of the movable sections 54, 56 can be increased even further, for example, by means of electrical or chemical activation.

The actuators shown in FIGS. 2A to 2C, as well as additional constructions of actuators, may be used in a plurality of ways for the movement of a motor vehicle shell.

Figure 3A:
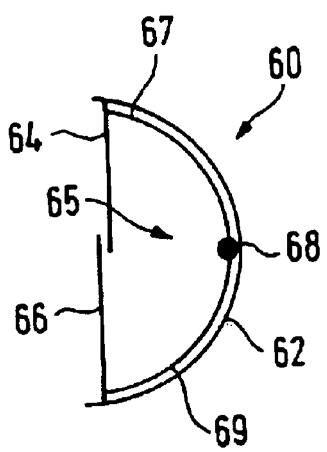
FIGS. 3A to 3D show two exemplary embodiments of an outside mirror according to the invention.
Figure 3B:
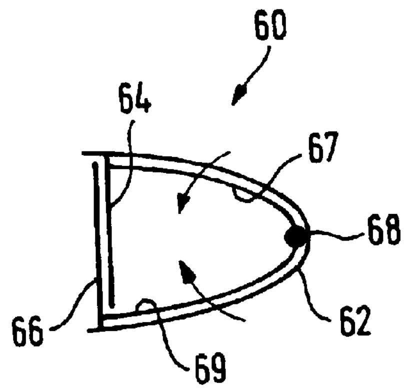

FIGS. 3A to 3B show a first exemplary embodiment of a movable shell in the form of a deformable outside mirror 60. The outside mirror 60 has an elastically deformable mirror housing 62. In the area of an opening of the mirror housing 62, two mirrors 64, 66, which are movable relative to each other, are connected to the mirror housing 62.

Within the mirror housing 62, which has a parabolic cross-section, a mounting unit 68 for an actuator 65 is mounted at the vertex of a parabola. The actuator 65 basically corresponds to the actuator shown in FIG. 2C, however, the shape of the movable sections 67, 69 is adjusted to the ellipsoidal shape of the mirror housing 62. Accordingly, the polymeric and/or ion-exchanging materials of the movable sections 67, 69 also have the shape of an ellipsoidal surface.

In FIG. 3A, the shape of the outside mirror 60 when the motor vehicle is at rest is shown. The actuator 65 is not activated and the mirror housing 62 shows an optically attractive, flat shape. When the motor vehicle speed increases, the actuator 65 is activated, so that the mirror housing 62, as shown in FIG. 3B, is deformed in the direction of the arrow, causing the outside mirror 60 to take on a shape that is more aerodynamically effective. The deformation of the mirror housing 62 causes the mirrors 64, 66 to become displaced relative to one another, in such a way as to reciprocally overlap each other, thus reducing the total visible mirror surface. The deformation of the mirror housing 62, as shown in FIG. 3B, can take place abruptly when a certain speed is reached, or can progress continuously as a function of speed.

Figure 3C:
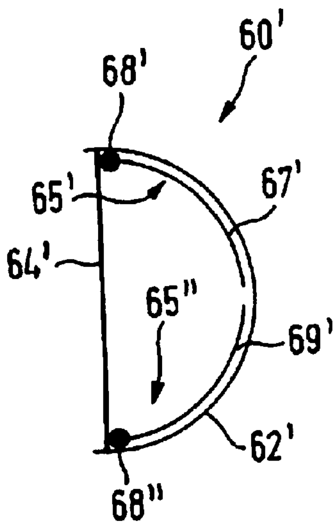
Figure 3D:
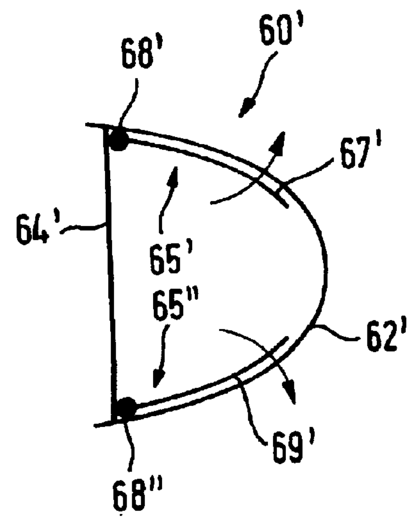

FIGS. 3C and 3D show a second exemplary embodiment of a movable shell in the form of a deformable outside mirror 60'. Again, the outside mirror 60' has an elastically deformable mirror housing 62', but with only a single mirror 64'. Within the mirror housing 62', which has a parabolic cross-section, two actuators 65', 65" are mounted in the area of the mirror element 64'. The actuators 65', 65" basically correspond to the actuator shown in FIG. 2A, however the shape of the movable sections 67', 69' is adjusted to the ellipsoidal shape of the mirror housing 62'. In addition, the movable segments 67', 69' are already in the initial state (FIG. 3C). With activation of the actuators 65', 65", the mirror housing 62', as shown in FIG. 3D, becomes deformed in the direction of the arrow, causing the outside mirror 60' to take on a more aerodynamically effective shape.

FIGS. 4A to 4D show a first exemplary embodiment of a movable shell in the form of a bumper 72 with a deformable air inlet area. The bumper 72 is shown in a frontal view in FIG. 4A, and in a sectional view in FIG. 4B. In the area of a bumper opening 70, an actuator 74 is mounted, with a ring-shaped mounting unit 80 and a movable section 82 that is connected to the mounting unit 80. In the initial state, the movable section 82 is hollow and approximately cylindrical in shape.

The actuator 74 and an elastic hollow cylinder 76, which is activated by said actuator 74 and radially arranged outside thereof, form an air inlet channel 78. The rigid, ring-shaped mounting unit 80 is located at the inlet end of the air inlet channel 78 and defines the size of the opening 70. Accordingly, the actuator simultaneously constitutes part of the shell.

Figure 4A:
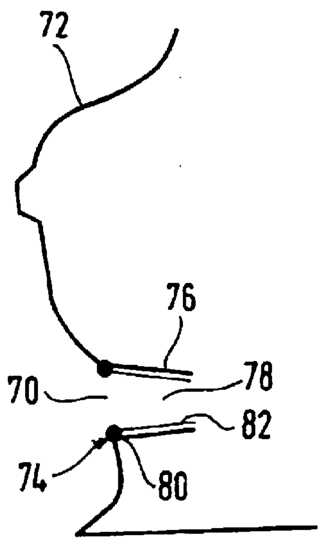
FIGS. 4A to 4D show a first exemplary embodiment of a shell according to the invention, with a movable air inlet opening.
Figure 4B:
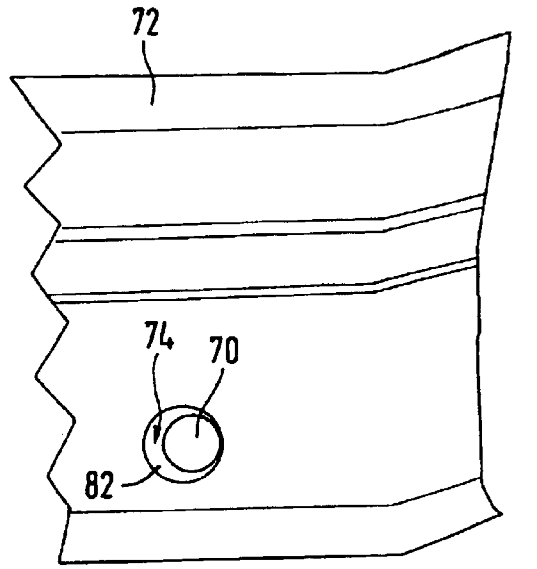
Figure 4C:
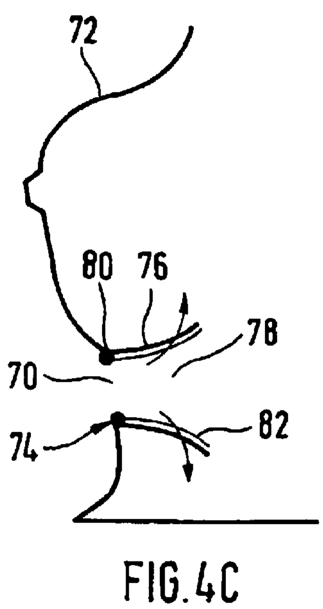
Figure 4D:
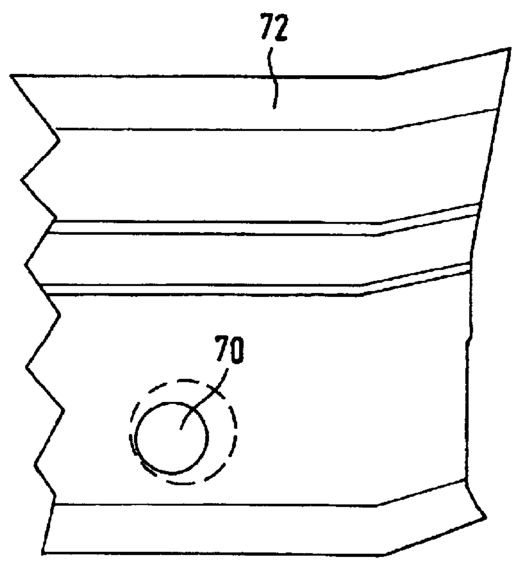

In the position of the actuator 74 shown in FIGS. 4A and 4B, the diameter at the outlet end of the air inlet channel 78 is smaller than the diameter of the opening 70 at the inlet end. The air volume entering through the opening 70 is accordingly restricted. As is shown in FIGS. 4C and 4D, an activation of the actuator 74 causes the hollow cylindrical, movable section 82 to be radially deformed in an outward direction, at the end farther from the mounting unit 80. The elastic hollow cylinder 76 is also affected by this deformation. The deformation of the air inlet channel 78 at its outlet end becomes greater, and the volume of air passing through the air inlet channel 78 increases.

The actuator 74 illustrated in FIGS. 4A to 4D with the movable section 82 in the form of a hollow cylinder can be replaced by a multitude of the actuators 30 illustrated in FIG. 2A. In order to allow said replacement, these actuators must be oriented such that the movable sections 34 form a hollow cylinder. The actuator 74 could also be replaced by the actuator 40 shown in FIG. 2B. In such a case, the mounting unit 42 would have to be axially arranged relative to the air inlet channel 78.

FIGS. 5A to 5D show a second exemplary embodiment of a movable shell in the form of a bumper 72' with a deformable air inlet area. The second embodiment, to a very great degree, corresponds to the first embodiment; however, the ring-shaped mounting unit 80' is positioned at the outlet end of the air inlet channel 78', in a manner which deviates from the first exemplary embodiment.

Figure 5A:
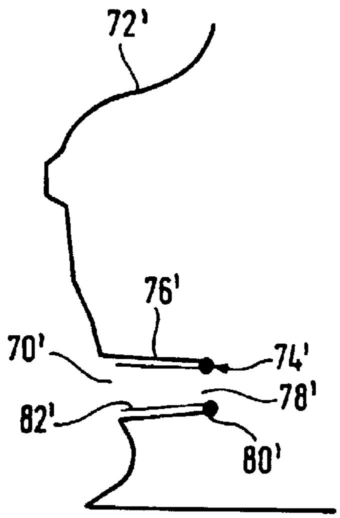
FIGS. 5A to 5D show a second exemplary embodiment of a shell according to the invention, with a movable air inlet opening.
Figure 5B:
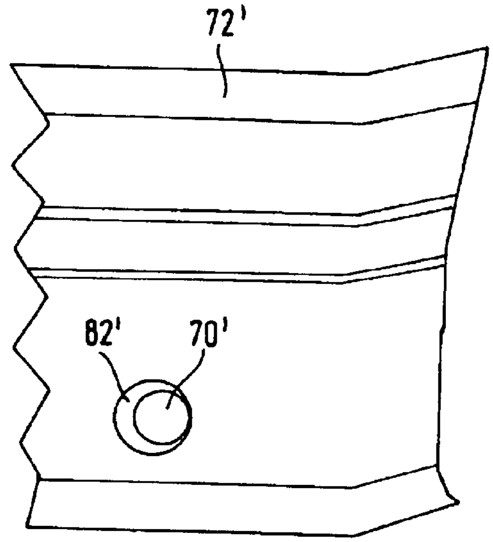

In the initial position of the actuator 74' shown in FIGS. 5A and 5B, the air inlet channel 78' is again hollow and basically cylindrical in shape.

Figure 5C:
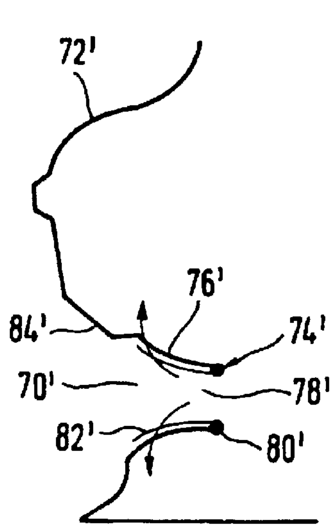
Figure 5D:
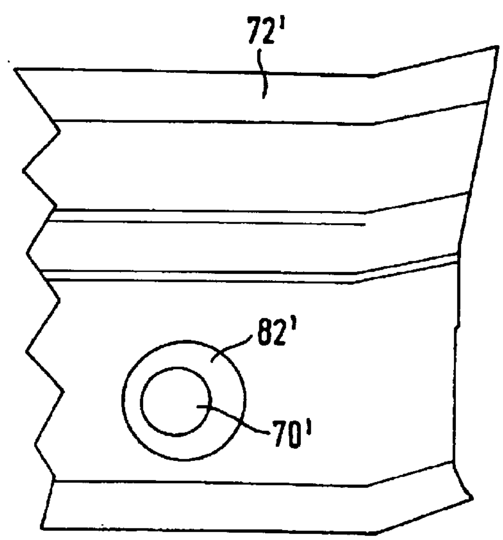

Activation of the actuator 74' causes the movable section 82' to become radially deformed in an outward direction, at the end farther from the mounting unit 80' (FIGS. 5C and 5D). The elastic hollow cylinder 76' is also affected by this deformation, as is an elastic area 84' of the bumper shell, which connects to the front of the elastic hollow cylinder 76' in the direction of travel. This deformation has the effect of enlarging the diameter of the opening 70' on the inlet side. The inlet channel 78' subsequently assumes the shape of a funnel, and the volume of air passing through the air inlet channel 78' increases.

The control of the volume of air passing through the openings 70, 70' in the bumper shell 72, 72' shown in FIGS. 4A to 4D and 5A to 5D can be controlled either as a function of the travel situation (for example, as a function of speed), or as a function of environmental parameters (for example, outside temperature).

Figure 6A:
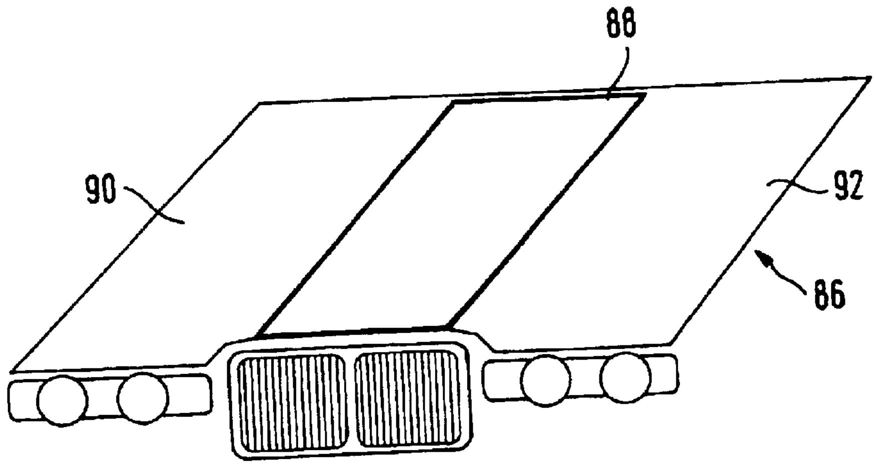
FIGS. 6A to 6C show a first exemplary embodiment of a hood according to the invention, which shows a movable area.
Figure 6B:
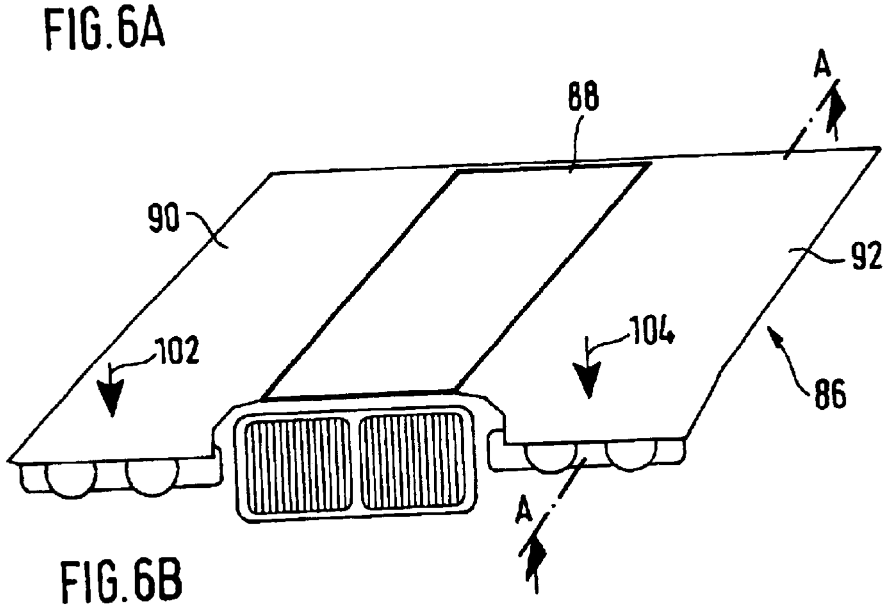
Figure 6C:
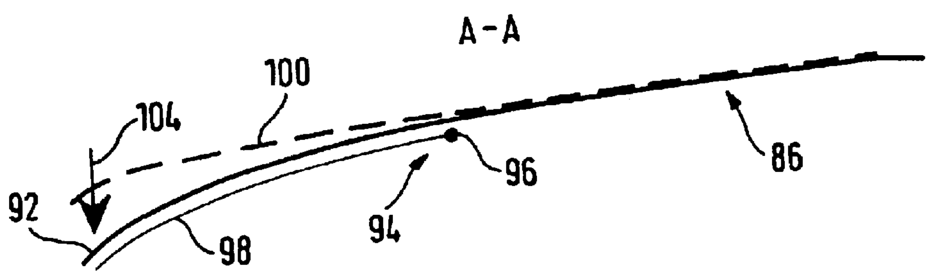

FIGS. 6A to 6C show a first exemplary embodiment of a hood 86 having a movable area. The hood 86 has a central section 88, which extends axially to the direction of travel, and lateral sections 90, 92 arranged to the left and to the right of said central section 88. Whereas the central section 88 is not movable, each of the elastic lateral sections 90, 92 can be moved by an actuator 94 shown in FIG. 6C. The construction of the actuator 94 is similar to that of the actuator 30 as shown in FIG. 2A, however the length of the mounting unit 96 and the length-to-width ratio of the movable section 98 of the actuator 94 are adjusted to the dimensions of the hood 86.

The movable hood 86 shown in FIGS. 6A to 6C simplifies the parking of the motor vehicle. Prior to the parking procedure, the hood exhibits the shape shown in FIG. 6A. This shape is indicated in FIG. 6C by the dashed line 100. At the start of the parking procedure, an area located in front of each of the two lateral sections 90, 92 in the direction of travel is deformed in the direction of the roadbed. This deformation is indicated by the arrows 102, 104 in FIG. 6B and by the arrow 104 in FIG. 6C. The deformation of the areas of the lateral sections 90, 92 in the direction of the roadbed improves vision downward and to the front, thereby simplifying parking.

Figure 7A:
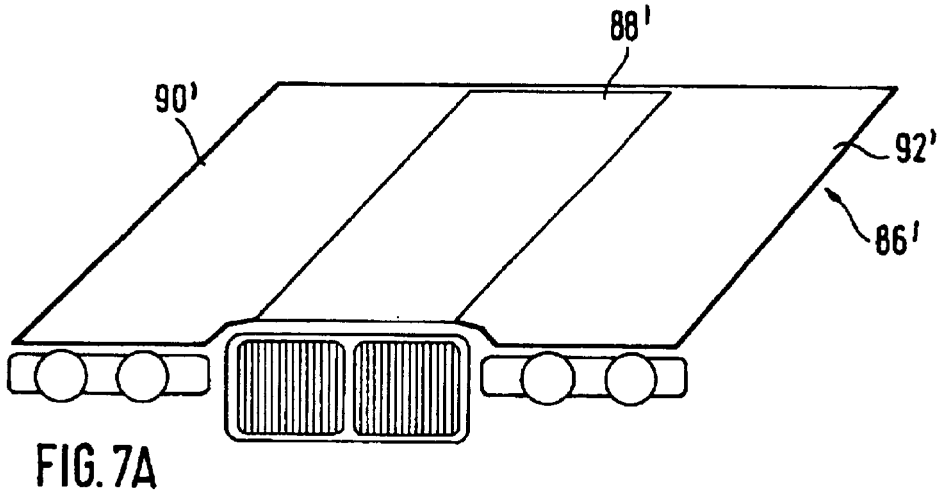
FIGS. 7A to 7C show a second exemplary embodiment of a hood according to the invention, which shows a movable area.
Figure 7B:
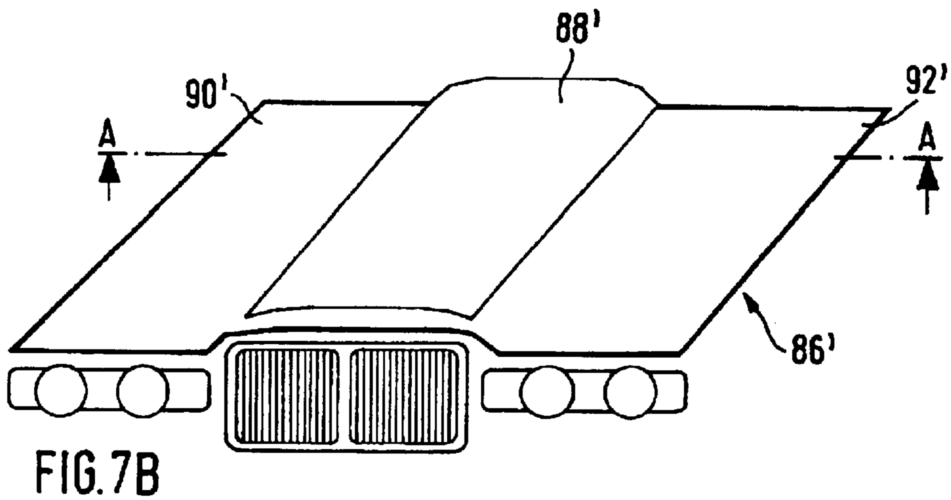
Figure 7C:
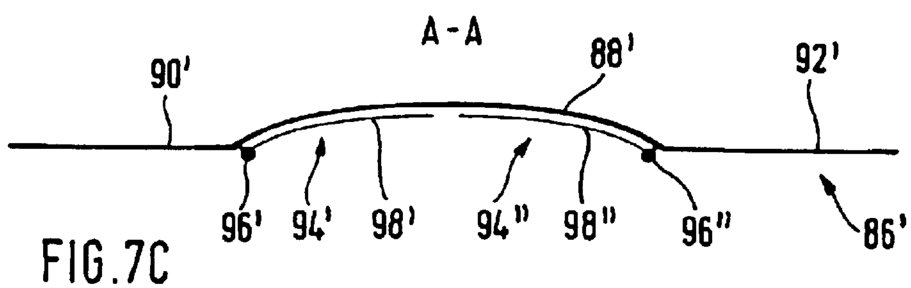

FIGS. 7A to 7C show a second exemplary embodiment of a hood 86' having a movable area. The hood 86' has an elastic central section 88', which extends axially to the direction of travel, and immovable lateral sections 90', 92' arranged to the left and to the right of said central section 88'. As shown in FIG. 7C, two actuators, 94', 94" are located under the elastic central section 88' of the hood 86'. The mounting units 96', 96" for these actuators, 94', 94" extend axially to the direction of travel over approximately the entire length of the central section 88', and are arranged on opposite longitudinal sides of the central section 88'.

Activation of the actuators 94', 94" enables the selection of the most aerodynamically effective hood shape for a given motor vehicle speed. When the motor vehicle is at rest, the central section 88', as shown in FIG. 7A, is basically flat. At higher speeds, the actuators 94', 94" are activated and the central area 88' becomes arched (FIGS. 7B and 7C).

Figure 8A:
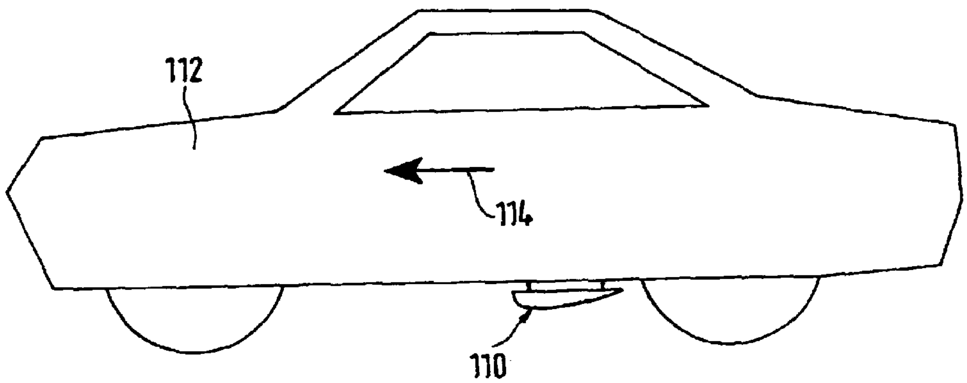
FIGS. 8A and 8B show an exemplary embodiment of the spoiler according to the invention.
Figure 8B:
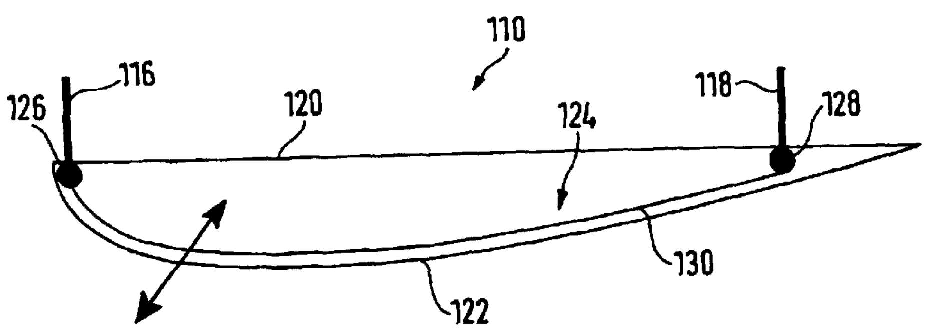

FIGS. 8A and 8B show an exemplary embodiment of a movable shell in the form of a spoiler 110 with a movable area. The spoiler 110 is located on the underside of a motor vehicle 112 and has an aerodynamically effective shape. The direction of travel is indicated with the arrow 114.

FIG. 8B shows the spoiler 110 in cross-section. The spoiler 110 is connected via two fasteners 116, 118 to the underside of the motor vehicle shown in FIG. 8A. A flat surface 120 of the spoiler 110, which faces the underside of the motor vehicle, is made of a rigid material. A surface 122 of the spoiler 110, which faces away from the underside of the motor vehicle, consists of an elastic material.

The surface 122 can be deformed by means of an actuator 124. The actuator 124 is equipped with two mounting units 126, 128, between which a movable section 130 is arranged. The movable section 130 moves as a function of the humidity of the air relative to the roadbed, in order to press the motor vehicle more strongly against the roadbed in the case of higher atmospheric humidity (rain). To this end, the movable section 130 consists, for example, of an ion-exchanging polymeric material, which automatically becomes deformed by swelling when the atmospheric humidity increases. The spoiler 110, at least in the area of the surface 122, is made of a material that is permeable to humidity.

Because the movable section 130 of the actuator 124 is made of a material that automatically becomes deformed when environmental conditions change, the mounting units 126, 128 need not be equipped with supply lines for the activation of the actuator 124. Rather, the primary function of the mounting units 126, 128 is to fasten and stabilize the movable section 130.

According to an exemplary embodiment that is not shown here, a plurality of electrically activated actuators in the form of small cylinders, located very close to one another, are embedded in the shell in such a way that the surfaces of the actuators in the initial condition are flush with the shell. In this manner, when the motor vehicle is at rest, the aesthetic impression of a smooth surface is achieved. The cylindrical actuators become deformed perpendicular to the shell, in such a way as to create a knobby structure.

When the knobby structure is used to form the housing for an outside mirror, for example, air resistance can be reduced and undesirable wind noise at high speeds can be lessened. It is also possible, by means of a knobby formation, to detach ice or snow from the shell.

Cylindrical actuators with varying lengths may be manufactured based upon polymers encapsulated in latex as described above, for example, such that the length of said actuators can be influenced by chemical processes.

What is claimed is:

1. An at least partially deformable motor vehicle shell comprising at least one actuator arranged to provide active, controlled shell deformation, wherein said actuator includes a material that can be moved by physical or chemical effects, and wherein said actuator is at least one of a polymeric actuator, an actuator which functions as an ion exchanger, or an actuator which exhibits varying confirmations.

2. The motor vehicle shell according to claim 1, wherein the shell is equipped with a rigid or elastic area which is coupled with the actuator.

3. The motor vehicle shell according to claim 1, wherein the actuator itself constitutes part of the shell.

4. The motor vehicle shell according to claim 1, wherein the shell is deformable in an area of an outside mirror.

5. The motor vehicle shell according to claim 4, wherein at least one of a mirror housing shape and dimensions of a mirror surface can be altered by the actuator.

6. The motor vehicle shell according to claim 1, wherein the shell is deformable in an area of a hood.

7. The motor vehicle shell according to claim 6, wherein the actuator is arranged in a front area of the hood in the direction of travel.

8. The motor vehicle shell according to claim 6, wherein the actuator is arranged in the center of the hood, axially to the direction of travel.

9. The motor vehicle shell according to claim 1, wherein the shell is deformable in the area of a spoiler.

10. An at least partially movable motor vehicle shell comprising at least one actuator provided for movement of the shell, wherein said actuator includes a material that can be moved by physical or chemical effects, wherein said actuator is at least one of a polymeric actuator, an actuator which functions as an ion exchanger, and an actuator which exhibits varying confirmations, wherein the shell is movable in the area of a spoiler, and wherein the spoiler is arranged on the underside of a vehicle.

11. The motor vehicle shell according to claim 6, wherein the actuator is movable in a direction that is perpendicular to a roadbed.

12. The motor vehicle shell according to claim 1, wherein the actuator is located in an area of an opening in the shell.

13. The motor vehicle shell according to claim 12, wherein the actuator forms a channel adjacent to the opening.

14. The motor vehicle shell according to claim 12, wherein the actuator is shaped so as to at least one of close, cover, reduce and enlarge the opening.

15. The motor vehicle shell according to claim 1, wherein the at least one actuator is one of a plurality of actuators arranged close to one another in an area of the shell, and wherein the actuators are movable perpendicular to the shell so as to create a knobby structure.

16. The motor vehicle shell according to claim 1, wherein the actuator is coupled with a sensor.

17. The motor vehicle shell according to claim 1, wherein the actuator includes several layers of polymeric material, ion-exchanging material, or polymeric and ion-exchanging material.

18. The motor vehicle shell according to claim 1, wherein the actuator includes an envelope that encloses polymeric material, ion-exchanging material, or polymeric and ion-exchanging material.

19. The motor vehicle shell according to claim 1, wherein the actuator includes at least one of a polymeric material and an ion-exchanging material which takes the shape of a strip, a hollow cylinder, or part of an ellipsoidal surface.

20. The motor vehicle shell according to claim 1, wherein the actuator includes at least one of a polymeric material and an ion-exchanging material which can be moved by electrical processes or by changing any of a pH value, humidity, or a temperature of the material.

21. The motor vehicle shell according to claim 1, wherein the actuator includes a liquid crystal elastomer material that exhibits varying confirmations and which is movable by means of electrical processes.

* * * * *